United States Patent
Ozawa et al.

(10) Patent No.: US 10,118,494 B2
(45) Date of Patent: Nov. 6, 2018

(54) VEHICLE CONTROL METHOD AND VEHICLE CONTROL DEVICE

(71) Applicant: Nissan Motor Co., Ltd., Yokohama-shi, Kanagawa (JP)

(72) Inventors: Yuuki Ozawa, Kanagawa (JP); Youko Yoshioka, Kanagawa (JP); Takao Andou, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/572,955

(22) PCT Filed: Jun. 15, 2015

(86) PCT No.: PCT/JP2015/067130
§ 371 (c)(1),
(2) Date: Nov. 9, 2017

(87) PCT Pub. No.: WO2016/203509
PCT Pub. Date: Dec. 22, 2016

(65) Prior Publication Data
US 2018/0118035 A1     May 3, 2018

(51) Int. Cl.
*B60L 11/00*     (2006.01)
*B60L 9/18*      (2006.01)
*B60K 6/48*      (2007.10)
*B60W 10/08*     (2006.01)
(Continued)

(52) U.S. Cl.
CPC .................. *B60L 9/18* (2013.01); *B60K 6/48* (2013.01); *B60K 6/543* (2013.01);
(Continued)

(58) Field of Classification Search
CPC .......... B60K 6/48; B60K 6/445; B60K 6/485; B60K 6/543; B60L 11/14; B60L 9/18
See application file for complete search history.

(56) References Cited

U.S. PATENT DOCUMENTS 8,464,851 B2 *   6/2013   Moorman ........... F16H 61/0206
                                                  192/3.3
8,500,589 B2 *   8/2013   Ortmann ................ B60K 6/387
                                                  475/152

(Continued)

FOREIGN PATENT DOCUMENTS

CN     101041353 A     9/2007
CN     103183022 A     7/2013
(Continued)

*Primary Examiner* — Hau V Phan
(74) *Attorney, Agent, or Firm* — Global IP Counselors, LLP

(57) ABSTRACT

A vehicle control method is provided for controlling a vehicle having a friction clutch configured to switch between engagement and disengagement between a motor/generator and a drive wheel. The vehicle control method includes maintaining a friction clutch disengaged with slack eliminated in a stroke while the vehicle is stopped, reducing a motor rotational speed using a predetermined rotational speed as a target motor rotational speed in response a request to stop a motor/generator upon determining the motor rotational speed of the motor/generator is greater than the predetermined rotational speed, and when the motor rotational speed has reached the predetermined rotational speed, reducing the motor rotational speed toward zero while limiting the torque of the motor/generator.

5 Claims, 4 Drawing Sheets

(51) Int. Cl.
*B60W 20/00* (2016.01)
*B60K 6/543* (2007.10)
*B60L 15/20* (2006.01)
*B60W 10/02* (2006.01)
*B60W 10/30* (2006.01)
*B60W 30/18* (2012.01)
*B60W 30/20* (2006.01)
*F16D 48/06* (2006.01)
*B60W 20/40* (2016.01)
*B60W 20/14* (2016.01)

(52) U.S. Cl.
CPC ......... *B60L 15/2009* (2013.01); *B60W 10/02* (2013.01); *B60W 10/08* (2013.01); *B60W 10/30* (2013.01); *B60W 20/00* (2013.01); *B60W 20/40* (2013.01); *B60W 30/18054* (2013.01); *B60W 30/20* (2013.01); *F16D 48/06* (2013.01); *B60W 20/14* (2016.01); *B60W 2520/04* (2013.01); *B60W 2710/081* (2013.01); *B60W 2710/083* (2013.01); *Y02T 10/7258* (2013.01)

(56) References Cited

U.S. PATENT DOCUMENTS 8,942,901 B2* 1/2015 Lundberg ............ F16H 61/0251
477/168

2009/0232673 A1* 9/2009 Reisch ................ F16H 57/0434
417/364
2010/0274423 A1 10/2010 Seel et al.
2011/0239804 A1* 10/2011 Hase ........................ B60K 6/48
74/473.11
2011/0246009 A1* 10/2011 Hase ........................ B60K 6/48
701/22
2012/0065822 A1* 3/2012 Ishiguro .................. B60K 6/48
701/22
2013/0310216 A1* 11/2013 Kamiya .................. B60L 11/14
477/5
2013/0325238 A1* 12/2013 Kato ..................... B60K 6/485
701/22
2014/0288754 A1 9/2014 Kasuya et al.
2014/0371964 A1* 12/2014 Kitahata ................ B60K 6/445
701/22
2015/0032358 A1 1/2015 Amemiya
2015/0051817 A1 2/2015 Murata et al.

FOREIGN PATENT DOCUMENTS

| JP | H10-290502 A | 10/1998 |
| JP | 2010-149630 A | 7/2010 |
| JP | 2011-250648 A | 12/2011 |
| JP | 2013-153618 A | 8/2013 |
| JP | 2013-189136 A | 9/2013 |
| WO | 2013/081121 A1 | 6/2013 |

* cited by examiner

VEHICLE CONTROL METHOD AND VEHICLE CONTROL DEVICE

CROSS-REFERENCE TO RELATED APPLICATIONS

This application is a U.S. National stage application of International Application No. PCT/JP2015/067130, filed Jun. 15, 2015.

BACKGROUND

Field of the Invention

The present invention relates to a vehicle control method and a vehicle control device.

Background Information

Japanese Laid-Open Patent Application No. 2013-189136 (Patent Document 1) discloses a technique to maintain the rotational speed of a motor/generator at a constant rotational speed when a vehicle is stopped, in a vehicle comprising a friction clutch that connects/disconnects the torque transmission between the motor/generator and the drive wheels.

SUMMARY

However, in the convention technology described above, since the motor/generator is driven even when the vehicle is stopped, there is room for improvement of the fuel efficiency. An object of the present invention is to provide a vehicle control method and a vehicle control device that can improve the fuel efficiency of a motor/generator.

In the present invention, a friction clutch of a vehicle is kept disengaged, with slack in the stroke eliminated, while the vehicle is stopped; in response to a request to stop a motor/generator, if the motor rotational speed of the motor/generator is greater than a predetermined rotational speed, the motor rotational speed is reduced using the predetermined rotational speed as a target motor rotational speed, and when the motor rotational speed has reached the predetermined rotational speed, the motor rotational speed is reduced toward zero, while a limit is placed on the torque of the motor/generator.

Therefore, in the present invention, it is possible to improve the fuel efficiency of the motor/generator.

BRIEF DESCRIPTION OF THE DRAWINGS

Referring now to the drawings, a vehicle control method and a vehicle control device for a hybrid vehicle are illustrated.

DETAILED DESCRIPTION OF THE EMBODIMENTS

Figure 1:
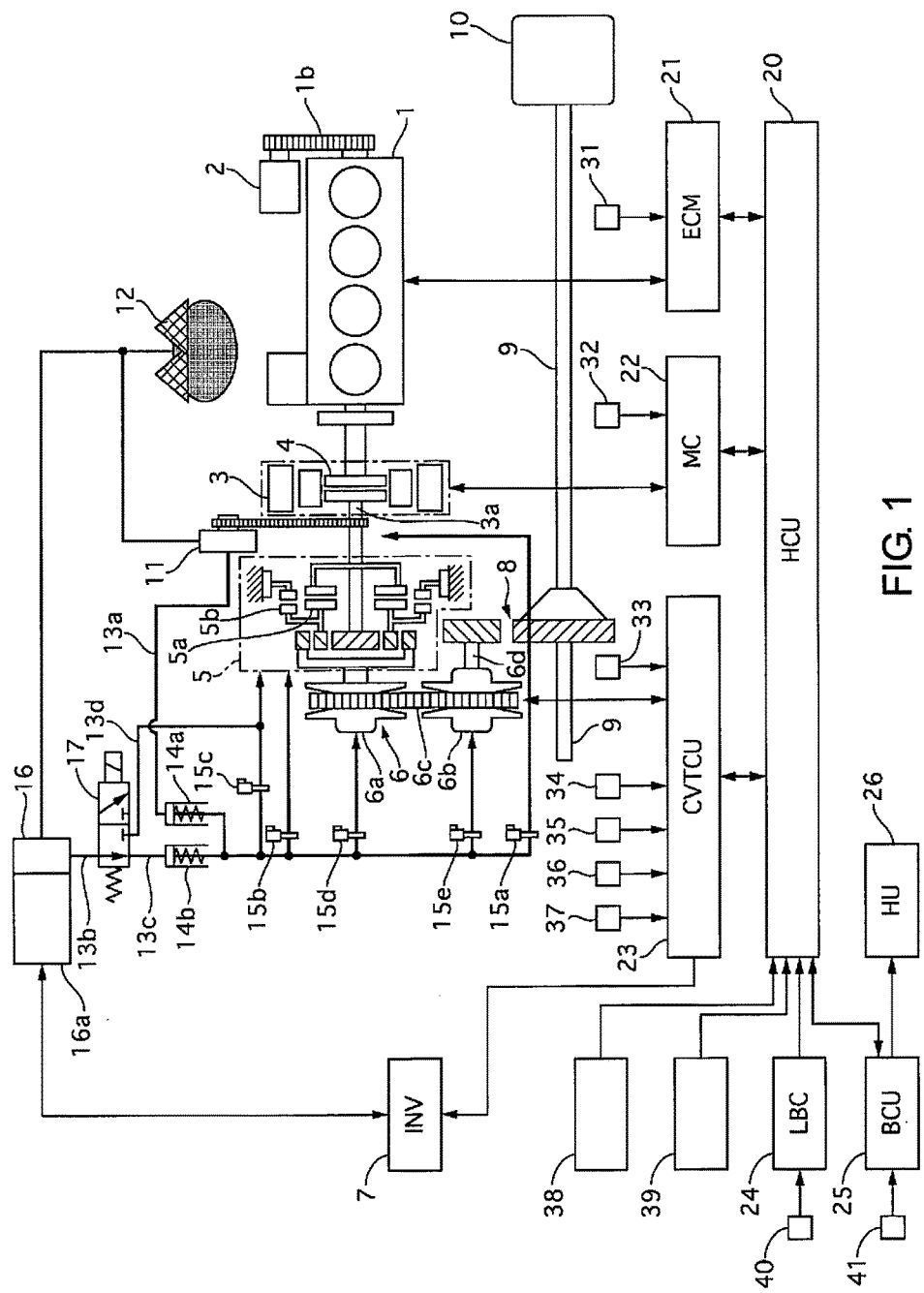
FIG. 1 is a configuration diagram of a powertrain of an FF hybrid vehicle in a first embodiment.

A preferred embodiment of a vehicle control method and a vehicle control device for a hybrid vehicle is explained below based on an embodiment illustrated in the drawings.

First Embodiment

FIG. 1 is a configuration view of a powertrain of an FF hybrid vehicle of the first embodiment. The engine 1 is a transverse engine that is disposed in a front compartment, such that the rotational axis direction of the crankshaft 1a is oriented in the vehicle width direction. The starter motor 2 meshes with an engine starting gear 1b provided relative to the crankshaft 1a. The starter motor 2 uses a 12V battery, which is not shown, as the power source. The 12V battery is charged by the starter motor 2 functioning as a generator during an operation of the engine 1. In addition, the 12V battery is charged with electrical power from a lithium-ion battery, which is not shown, via a DC/DC converter (not shown).

One of the motor output shafts 3a of the motor/generator 3 is connected to the engine 1 via a first clutch 4, and the other is connected to the belt type continuously variable transmission (CVT) 6 via a second clutch 5. The motor/generator 3 is a three-phase alternating current permanent magnet type synchronous motor, and uses a lithium-ion battery as a power source. An inverter 7 is connected to a stator coil of the motor/generator 3. The inverter 7 converts direct current electrical power from the lithium-ion battery into three-phase alternating current electrical power during powering of the motor/generator 3 and supplies same to the motor/generator 3. In addition, the inverter 7 converts a three-phase alternating current electrical power generated by the motor/generator 3 into a direct current during regeneration of the motor/generator 3, and charges the lithium-ion battery.

The first clutch 4 is a normally-closed, dry-type, single-plate friction clutch that can continuously change the engagement capacity according to the supplied hydraulic oil pressure. The first clutch 4 is provided in the housing of the motor/generator 3. A forward clutch 5a and a reverse brake 5b, which are provided in a forward/reverse switching mechanism of the CVT 6 by planetary gears, are diverted for use as the second clutch 5. The forward clutch 5a and the reverse brake 5b are both normally-open, wet-type, single-plate friction clutches that can continuously change the engagement capacity according to the supplied hydraulic oil pressure. In the following description, the forward clutch 5a and the reverse brake 5b are collectively referred to as the second clutch 5, except when individual descriptions are provided therefor. The CVT 6 is a transmission that can achieve a stepless transmission ratio by changing the winding diameter of a belt 6c according to the hydraulic oil pressure that is supplied to the respective cylinder chamber of a primary pulley 6a and a secondary pulley 6b. The output shaft 6d of the CVT 6 is connected to left and right front wheels 10, which are the drive wheels, via a final reduction gear train 8, a differential gear (not shown), and left and right drive shafts 9.

The main mechanical oil pump (oil pump) 11 draws and pressurizes the oil stored in the oil pan 12 and discharges the same to the oil passage 13a. The main mechanical oil pump 11 is rotationally driven by the motor output shaft 3a. The oil that is discharged into the oil passage 13a is passed through a flapper valve 14a, then regulated as a hydraulic oil pressure by respective proportional solenoids 15a, 15b, 15c, 15d, 15e, and then respectively supplied to the first clutch 4, the forward clutch 5a of the second clutch 5, the reverse brake 5b of the second clutch 5, the primary pulley 6a, and the secondary pulley 6b. The flapper valve 14a is a one-way valve that opens when at or above a predetermined pressure.

The sub-electric oil pump (electric oil pump) 16 sucks up and pressurizes the oil stored in the oil pan 12, and discharges the same to the oil passage 13b. The sub-electric oil pump 16 is rotationally driven by an electric motor 16a, which uses the lithium-ion battery as a power source. In view of cost and mountability, the sub-electric oil pump 16 uses an oil pump with a smaller discharge capacity than the main mechanical oil pump 11. The oil that is discharged into the oil passage 13b is supplied to one of the oil passage 13c and the oil passage 13d by a switching valve 17. The switching valve 17 connects the oil passage 13b and the oil passage 13c at the time of non-energization, and connects the oil passage 13b and the oil passage 13d at the time of energization. The oil that is supplied to the oil passage 13c is passed through a flapper valve 14b, then regulated as a hydraulic oil pressure by respective proportional solenoids 15a, 15b, 15c, 15d, 15e, and then respectively supplied to the first clutch 4, the forward clutch 5a of the second clutch 5, the reverse brake 5b of the second clutch 5, the primary pulley 6a, and the secondary pulley 6b. The flapper valve 14b is a one-way valve that opens when at or above a predetermined pressure. The oil that is supplied to the oil passage 13d is supplied to the forward clutch 5a as a standby hydraulic pressure for the elimination of backlash, which eliminates slack from the stroke of the forward clutch 5a. The switching valve 17 is energized when an idle stop starting condition is satisfied. Backlash elimination of the second clutch 5 (forward clutch 5a) will be described further below.

The one-motor two-clutch powertrain described above has three traveling modes, the "EV traveling mode," the "HEV traveling mode," and the "WSC traveling mode." In the EV traveling mode, traveling is carried out using only the motor/generator 3 as the drive source, with the first clutch 4 released and the second clutch 5 engaged. "Engagement" means a full engagement state in which a differential rotation between the input and output is not permitted. The motor/generator 3 carries out a torque control based on a target motor torque, and the target motor torque is set according to a required drive torque, which is determined from the accelerator position opening amount, the vehicle speed, and the like. In the HEV traveling mode, traveling is carried out, in which the engine 1 is included as a drive source, with the first clutch 4 and the second clutch 5 engaged. The target engine torque shall be an engine torque that can achieve an operating point with a high output efficiency of the engine 1. The motor/generator 3 carries out torque control based on the target motor torque, and the target motor torque shall be the difference between the required drive torque and the target engine torque.

In the WSC traveling mode, traveling is carried out using only the motor/generator 3 as the drive source, with the first clutch 4 released and the second clutch 5 slipped. "Slip" means a slip-engaged state in which a differential rotation between the input and output is permitted. The target second clutch engagement capacity is set according to the required drive torque. The rotational speed of the motor/generator 3 is controlled based on the target motor rotational speed, and the target motor rotational speed shall be the idling rotational speed of the engine 1. The selection of the traveling mode is made on basis of the accelerator position opening amount, the vehicle speed, and the battery SOC. When the accelerator position opening amount is equal to or less than a predetermined opening amount, the EV traveling mode is selected. When the accelerator position opening amount exceeds the predetermined opening amount, the WSC traveling mode is selected in a low vehicle speed region, and the HEV traveling mode is selected in a medium to high vehicle speed region. The WSC traveling mode is selected even when the accelerator position opening amount is equal to or less than the predetermined opening amount if the battery SOC is low.

The FF hybrid vehicle of the first embodiment has, as a configuration for controlling the powertrain, a hybrid control module (HCM) 20, an engine control module (ECM) 21, a motor controller (MC) 22, a CVT control unit (CVTCU) 23, a lithium-ion battery controller (LBC) 24, and a brake control unit (BCU) 25. These are connected via a CAN communication line. The HCM (control unit) 20 manages the energy consumption of the entire vehicle, and assumes the function of running the vehicle at maximum efficiency. The HCM 20 inputs the engine rotational speed detected by an engine rotational speed sensor 31, the motor rotational speed detected by a motor rotational speed sensor 32, the transmission input rotational speed detected by a transmission input rotational speed sensor 33, a primary pressure detected by a primary hydraulic pressure sensor 34, a secondary pressure detected by a secondary hydraulic pressure sensor 35, a forward clutch hydraulic pressure (second clutch hydraulic pressure) detected by a second clutch hydraulic pressure sensor 36, an oil temperature detected by an oil temperature sensor 37, an accelerator position opening amount detected by an accelerator position opening amount sensor 38, a brake pedal stroke detected by a brake pedal stroke sensor 39, a battery SOC, a battery temperature detected by a battery temperature sensor 40, and the vehicle speed calculated from the speed of each of wheel detected by a wheel speed sensor 41, directly or via CAN communication. The HCM 20 determines the operating point of the powertrain and selects the traveling mode based on each piece of input information, and generates each of the target values (target engine torque, target motor torque or target motor rotational speed, target first clutch engagement capacity, target second clutch engagement capacity, target transmission ratio, target deceleration degree, and the like) in accordance with the traveling mode and the state of the lithium-ion battery.

The ECM 21 outputs a command for controlling the engine operating point to a throttle valve actuator of the engine 1 based on the target engine torque, and the like. The MC 22 outputs a command for controlling the motor operating point to the inverter 7, based on the target motor torque (or the target motor rotational speed). The CVTCU 23 outputs a command for controlling the engagement capacity of each of the first clutch 4 and the second clutch 5 to the respective proportional solenoids 15a, 15b, 15c, based on the target first clutch engagement capacity and the target second clutch engagement capacity. In addition, the CVTCU 23 outputs a command for controlling the belt winding diameters of the primary pulley 6a and the secondary pulley 6b to the respective proportional solenoids 15d, 15e, based on the target transmission ratio. The BCU 25 outputs a command for controlling the frictional braking torque that is generated by a disc brake provided to each wheel to the hydraulic pressure control unit (HU) 26, based on the target rate of deceleration. Additionally, when the target rate of deceleration cannot be achieved by only the regenerative braking torque during regeneration of the motor/generator 3, the BCU 25 outputs a command to compensate for the deficiency with the frictional braking torque to the HU 26 (regenerative cooperation control). The HU 26 supplies brake fluid to a hydraulic caliper of each disc brake, based on the command from the BCU 25.

When in an extremely low vehicle speed region and the accelerator position opening amount is zero when the EV traveling mode is selected, the HCM 20 executes a motor idle control that causes the motor/generator 3 to generate torque corresponding to the creep torque. In the motor idle control, the target motor rotational speed is set to a predetermined motor idle rotational speed (for example, 600 rpm), and sets the target second clutch engagement capacity to correspond to the creep torque (for example, 40 Nm). The torque corresponding to the creep torque may be increased as the vehicle speed decreases. In addition, when an idle stop permitting condition is established during motor idle control, the HCM 20 determines that a stop request for the motor/generator 3 has been made, sets the target second clutch engagement capacity to zero, and executes an idle stop control to stop the motor/generator 3. When an idle stop canceling condition is established while executing an idle stop control, the HCM 20 restarts the motor/generator 3.

The idle stop permitting condition shall be, for example, when all of the following four conditions are met.
1. D range is being selected
2. A vehicle stopped state (vehicle speed is zero) has continued for a set period of time
3. Brake fluid pressure is equal to or greater than a predetermined pressure
4. The battery SOC is equal to or greater than a predetermined amount On the other hand, the idle stop canceling condition shall be, for example, when all of the following conditions 5 to 7 are satisfied, and at least one of conditions 8 to 10 is satisfied.
5. D range is being selected
6. The vehicle is in a stopped state
7. During idle stop
8. The accelerator position opening amount is not zero
9. The brake fluid pressure is less than a predetermined pressure
10. The battery SOC is less than a predetermined amount Since the motor/generator 3 is stopped during an idle stop, the main mechanical oil pump 11 no longer generates hydraulic pressure, and the supply of hydraulic oil pressure to the second clutch 5 is stopped. When hydraulic oil pressure is released from the second clutch 5, the engagement response delay of the second clutch 5 will be long at the time of the next start. The second clutch 5 generates an engagement capacity by the clutch plate being pressed by the piston. A return spring is provided relative to the piston from the standpoint of reducing drag torque, and if the supplied hydraulic pressure to the second clutch 5 is excessively reduced, the piston is returned by the return spring. As a result, if the piston and the clutch plate are separated from each other, even if the supply of hydraulic pressure is restarted, an engagement capacity is not generated in the second clutch 5 until the piston strokes and comes into contact with the clutch plate (until the slack in the stroke is eliminated); therefore, the time lag to start is increased. Therefore, when an idle stop starting condition is established, the HCM 20 energizes the switching valve 17 and rotationally drives the electric motor 16*a* at a prescribed rotational speed thereby to eliminate backlash of the second clutch 5, and carries out a motor stopping process to stop the motor/generator 3 after the completion of backlash elimination. By eliminating backlash of the second clutch 5 during an idle stop, it is possible to suppress an engagement response delay of the second clutch 5 at the time of the next start, and to improve the acceleration response.

Figure 2:
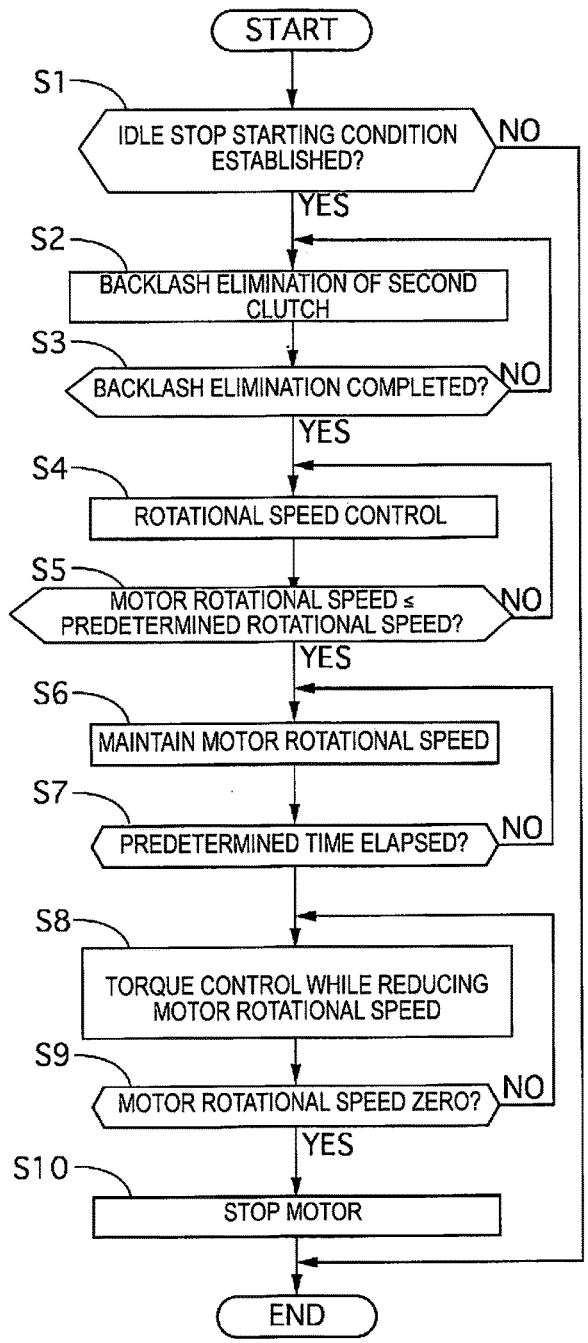
FIG. 2 is a flowchart illustrating the flow of a motor stopping process by the HCM 20 of the first embodiment.

FIG. 2 is a flowchart illustrating the flow of a motor stopping process by the HCM 20 in the first embodiment.

In Step S1, it is determined whether or not an idle stop starting condition has been established. In the case of YES, the process proceeds to Step S2, and if NO, the present control is ended.

In Step S2, the sub-electric oil pump 16 is actuated and backlash of the second clutch 5 is eliminated.

In Step S3, it is determined whether or not the backlash elimination of the second clutch 5 has been completed. In the case of YES, the process proceeds to Step S4, and if NO, the process returns to Step S2. In this step, when the rotational speed of the electric motor 16*a* reaches a specified rotational speed, it is determined that backlash elimination has been completed.

In Step S4, a rotational speed control of the motor/generator 3 is started. The target motor rotational speed shall be a predetermined rotational speed. The predetermined rotational speed is a rotational speed at which it is possible to guarantee a slip state of the second clutch 5, and shall be, for example, 300 rpm. In the rotational speed control, a torque command calculation value that eliminates the deviation between the target motor rotational speed and the actual motor rotational speed is calculated, and a command current corresponding to the calculated torque command value is output to the motor/generator 3.

In Step S5, it is determined whether or not the motor rotational speed is equal to or less than a predetermined rotational speed. In the case of YES, the process proceeds to Step S6, and if NO, the process returns to Step S4.

In Step S6, the motor rotational speed is maintained at a predetermined rotational speed.

In Step S7, it is determined whether or not a state in which the motor rotational speed is maintained at a predetermined rotational speed has continued for a predetermined time T. In the case of YES, the process proceeds to Step S8, and if NO, the process returns to Step S6. The predetermined time T shall be the time at which it is predicted that the actual motor torque (generated torque) will be balanced by the motor load torque, after the maintenance of the motor rotational speed is started. The motor load torque is the rotational torque that acts as a load on the motor output shaft 3*a* of the motor/generator 3. The predetermined time T is obtained beforehand experimentally.

In Step S8, the motor torque is limited while continuing the rotational speed control to reduce the motor rotational speed. The target motor rotational speed is maintained at a predetermined rotational speed (300 rpm). In this step, the torque command value of the rotational speed control and the previous torque command value/predetermined value are compared, and the smaller value is selected as the final torque command value.

In Step S9, it is determined whether or not the motor rotational speed is zero. In the case of YES, the process proceeds to Step S10, and if NO, the process returns to Step S8.

In Step S10, the torque command value is set to zero and the motor/generator 3 is stopped.

First Comparative Example

Figure 3:
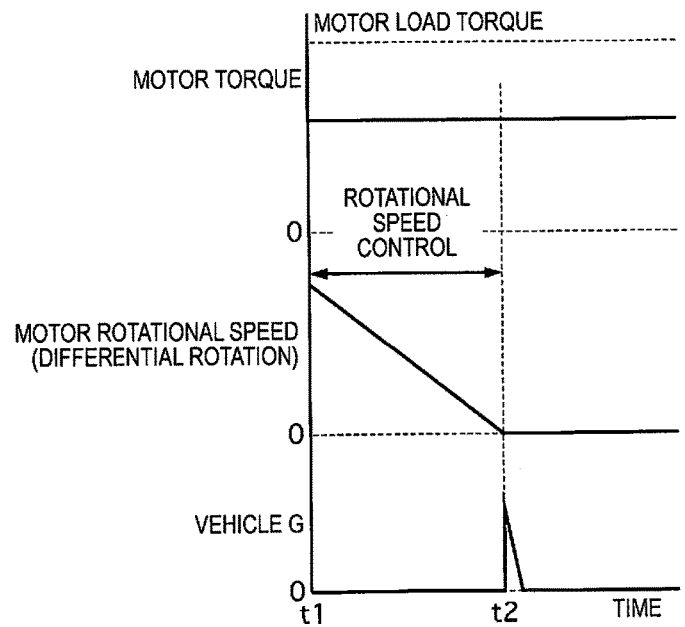
FIG. 3 is a time chart of a comparative example in which the rotation of the motor/generator 3 is stopped by only a rotational speed control during a motor stopping process.

Since the purpose of an idle stop is to improve fuel consumption performance, it is preferable to transition to an idle stop state, in which the motor/generator 3 is stopped as soon as possible once a stop request for the motor/generator 3 is made. For example, the motor rotational speed can be reduced at an early stage by using a rotational speed control. FIG. 3 is a time chart of a case in which the rotation of the motor/generator 3 is stopped by only a rotational speed control during a motor stopping process, as a comparative example of the first embodiment.

At time t1, since the backlash elimination of the second clutch 5 has been completed, a rotational speed control is started, whereby the motor rotational speed is reduced toward zero. If the motor/generator 3 is decelerated at a constant rotational acceleration, the motor torque becomes a value that is obtained by subtracting a constant value corresponding to the inertia torque from the motor load torque.

At time t2, the differential rotation between the input and output of the second clutch 5 becomes zero. At this time, accompanying the switch from a slip state in which there is a differential rotation between the input and output of the second clutch 5 to a lock-up state in which the differential rotation is zero, the vehicle G (longitudinal acceleration) varies greatly. The reasons therefor will be described below. The second clutch 5 is being subjected to backlash elimination such that the engagement capacity becomes zero. However, variation may be present in the engagement capacity of the second clutch 5, caused by individual differences, very long-term changes, oil temperature, and the like. If there is large non-negative variation, the second clutch 5 will have an engagement capacity. On the other hand, when the second clutch 5 changes from a slip state to a lock-up state, the coefficient of friction between the sliding contact members, which determines the engagement capacity of the second clutch 5, switches from a coefficient of kinetic friction to a coefficient of static friction. In general, since the coefficient of kinetic friction<coefficient of static friction, the engagement capacity of the second clutch 5 is increased in a stepwise manner, when switching from a slip state to a lock-up state. Consequently, when the second clutch 5 switches from a slip state to a lock-up state, the torque difference that is transmitted to the drive shaft 9 is increased as the rate of change of the differential rotation of the second clutch 5 (decrease gradient of the motor rotational speed) is increased, which appears as vehicle shock. As described above, in the rotational speed control, while the time to reduce the motor rotational speed can be controlled, the torque difference when the motor rotational speed becomes zero cannot be controlled.

Second Comparative Example

Figure 4:
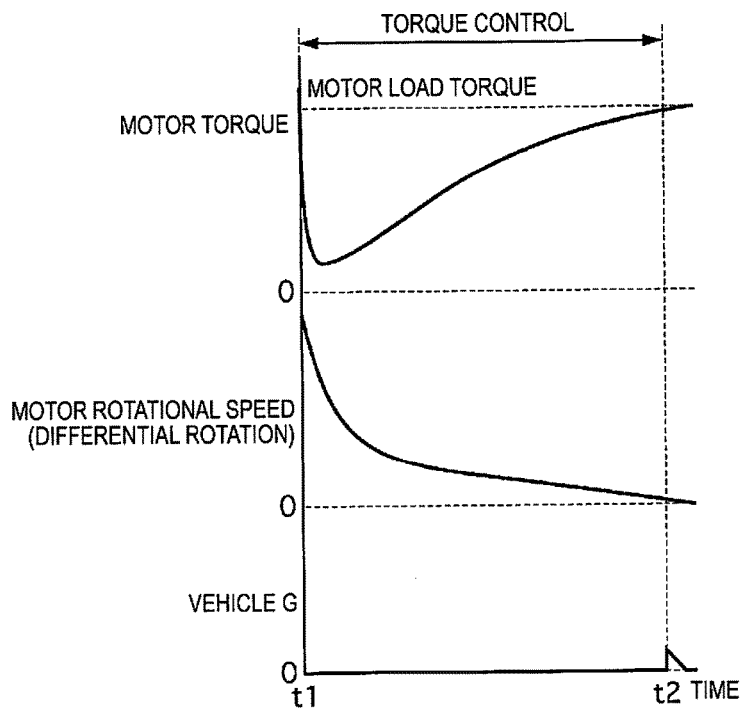
FIG. 4 is a time chart of a comparative example in which the rotation of the motor/generator 3 is stopped by only a torque control during a motor stopping process.

FIG. 4 is a time chart of a case in which the rotation of the motor/generator 3 is stopped by only torque control during a motor stopping process, as a comparative example of the first embodiment.

At time t1, since the backlash elimination of the second clutch 5 has been completed, a torque control is started. In the torque control, the motor torque is greatly reduced temporarily, which is then gradually increased such that the motor torque approaches the motor load torque. The motor rotational speed is thereby gradually reduced.

At time t2, the differential rotation between the input and output of the second clutch 5 becomes zero. At this time, since the rate of change of the differential rotation of the second clutch 5 is low, it is possible to make the torque difference small, and to reduce the vehicle shock.

As described above, in the torque control, whereas the torque difference when the motor torque becomes zero can be controlled, the time to reduce the motor rotational speed cannot be controlled. In order to gradually reduce the motor rotational speed, it is necessary to wait until the motor torque and the motor load torque become balanced, so that there is a long time lag between the time a motor/generator stop request is received and the motor/generator stops.

Figure 5:
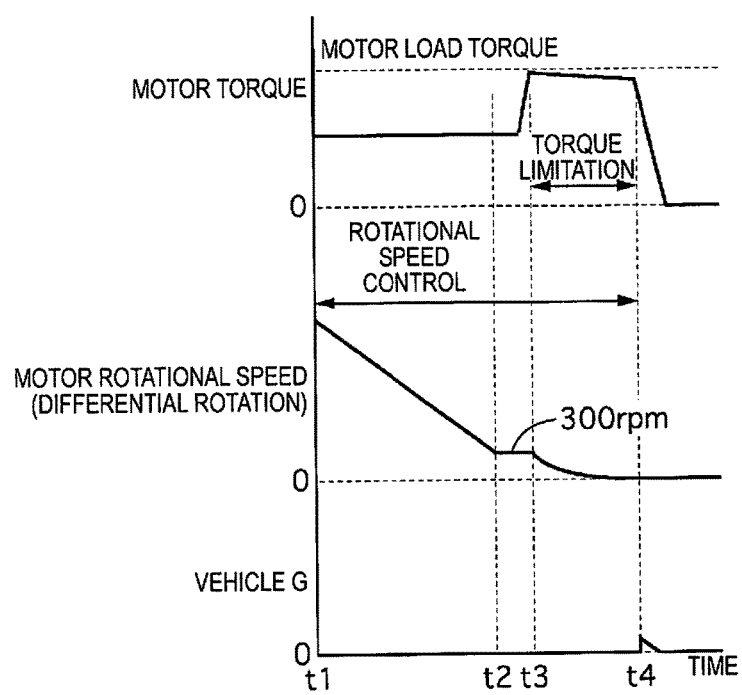
FIG. 5 is a time chart illustrating the torque limiting action of the first embodiment.

FIG. 5 is a time chart illustrating the torque limiting action of the first embodiment.

At time t1, since the backlash elimination of the second clutch has been completed, a rotational speed control is started, whereby the motor rotational speed is reduced toward a predetermined rotational speed (300 rpm). If the slip state of the second clutch 5 can be maintained, a torque difference is not generated even if the decrease gradient of the motor rotational speed is increased. Therefore, the motor rotational speed can be reduced to the predetermined rotational speed at an early stage by a rotational speed control.

At time t2, since the differential rotation between the input and output of the second clutch 5 (motor rotational speed) has reached the predetermined rotational speed, the motor rotational speed is maintained constant for a predetermined time T. At this time, while the motor torque is increased to the motor load torque due to the inertia torque becoming zero, since the second clutch 5 is in a slip state, the torque change can be absorbed by the differential rotation.

At time t3, since the predetermined time T has elapsed since time t2, torque limitation is started. At this time, since the target motor rotational speed is maintained at a predetermined rotational speed, the target motor rotational speed always has a greater value than the actual motor rotational speed. That is, since the torque command value that is obtained from the deviation between the target motor rotational speed and the actual motor rotational speed always has a greater value than the previous torque command value/predetermined value, the torque command value/predetermined value is selected as the final torque command value. As a result, it is possible to gradually reduce the motor torque while the motor torque is maintained at the desired upper limit value, while stably reducing the motor rotational speed.

At time t4, the differential rotation between the input and output of the second clutch 5 becomes zero. At this time, since the rate of change of the differential rotation of the second clutch 5 is low, it is possible to make the torque difference small, and to reduce the vehicle shock. Additionally, since the difference between the motor torque and the motor load torque is small, it is possible to prevent the torque difference from increasing, as this is only a matter of eliminating the inertia torque. When the motor rotational speed becomes zero, the motor/generator 3 is stopped.

The following effects are exerted in the first embodiment.

(1) A method for controlling a vehicle comprising a second clutch 5 configured to switch between engagement and disengagement between a motor/generator 3 and front wheels 10, a main mechanical oil pump 11 that supplies hydraulic oil pressure to the second clutch 5, and a sub-electric oil pump 16 driven by an electric motor 16a to supply hydraulic oil pressure to the second clutch 5, wherein the second clutch 5 is maintained disengaged, with slack eliminated in the stroke while the vehicle is stopped, reducing a motor rotational speed using a predetermined rotational speed as a target motor rotational speed in response a request to stop the motor/generator 3 upon determining the motor rotational speed of the motor/generator 3 is greater than the predetermined rotational speed (300 rpm), and when the motor rotational speed has reached the predetermined rotational speed, reducing the motor rotational speed toward zero while limiting the torque of the motor/generator 3. Therefore, it is possible to improve the fuel efficiency of the motor/generator 3 by stopping the motor/generator 3 when the vehicle is stopped. In addition, with respect to the main mechanical oil pump 11 not generating hydraulic pressure due to stopping the motor/generator 3, since backlash elimination of the second clutch 5 is carried out by the sub-electric oil pump 16, it is possible to suppress an engagement response delay of the second clutch 5 at the time of the next start. Furthermore, when stopping the motor/generator 3, since the motor rotational speed is reduced at an early stage by a rotational speed control in a state in which the differential rotation between the input and output of the second clutch 5 is large, and the motor torque is limited when the differential rotation between the input and output of the second clutch 5 becomes small, it is possible to achieve both shortening of the time lag until the motor/generator 3 stops, and a reduction in vehicle shock.

(2) When the motor rotational speed reaches the predetermined rotational speed, the motor rotational speed is maintained at a predetermined rotational speed until a predetermined time T has elapsed, after which torque limitation of the motor/generator 3 is started. Therefore, when the second clutch 5 switches from a slip state to a lock-up state, it is possible to prevent the torque difference from increasing, as this is accompanied by elimination of the inertia torque, and to further reduce vehicle shock.

(3) The target motor rotational speed when limiting the torque of the motor/generator 3 is set to a predetermined rotational speed. Therefore, it is possible to stably reduce the motor rotational speed without causing control hunting, or the like.

(4) The invention is provided with a second clutch 5 configured to switch between engagement and disengagement between a motor/generator 3 and front wheels 10, a main mechanical oil pump 11 configured to supply hydraulic oil pressure to the second clutch 5, and a sub-electric oil pump 16 driven by an electric motor 16a to supply hydraulic oil pressure to the second clutch 5, and an HCM 20 that maintains the second clutch 5 disengaged with slack eliminated in a stroke while the vehicle is stopped, that reduces the motor rotational speed using a predetermined rotational speed as a target motor rotational speed in response to a request to stop the motor/generator 3, if the motor rotational speed of the motor/generator 3 is greater than the predetermined rotational speed (300 rpm), and that reduces the motor rotational speed toward zero when the motor rotational speed has reached the predetermined rotational speed while limiting torque of the motor/generator 3. Therefore, it is possible to improve the fuel efficiency of the motor/generator 3 by stopping the motor/generator 3 when the vehicle is stopped. In addition, with respect to the main mechanical oil pump 11 not generating hydraulic pressure due to stopping the motor/generator 3, since backlash elimination of the second clutch 5 is carried out by the sub-electric oil pump 16, it is possible to suppress an engagement response delay of the second clutch 5 at the time of the next start. Furthermore, when stopping the motor/generator 3, since the motor rotational speed is reduced at an early stage by a rotational speed control in a state in which the differential rotation between the input and output of the second clutch 5 is large, and the motor torque is limited when the differential rotation between the input and output of the second clutch 5 becomes small, it is possible to achieve both shortening of the time lag until the motor/generator 3 stops and a reduction of the vehicle shock.

Other Embodiments

A preferred embodiment of the present invention was described above based on embodiments, but specific configurations of the present invention are not limited by the embodiments, and changes to the design made without departing from the scope of the invention are also included in the present invention. For example, the present invention can be applied to an electrically driven vehicle that has only a motor/generator as the drive source.

The invention claimed is:

1. A vehicle control method for controlling a vehicle comprising a friction clutch configured to switch between engagement and disengagement between a motor/generator and a drive wheel, an oil pump that supplies hydraulic oil pressure to the friction clutch, and an electric oil pump driven by an electric motor to supply hydraulic oil pressure to the friction clutch, the vehicle control method comprising:
maintaining the friction clutch disengaged with slack eliminated in a stroke while the vehicle is stopped,
reducing a motor rotational speed using a predetermined rotational speed as a target motor rotational speed in response a request to stop the motor/generator upon determining the motor rotational speed of the motor/generator is greater than the predetermined rotational speed, and
when the motor rotational speed has reached the predetermined rotational speed, reducing the motor rotational speed toward zero while limiting torque of the motor/generator.

2. The vehicle control method as recited in claim 1, wherein
when the motor rotational speed reaches the predetermined rotational speed, maintaining the motor rotational speed at the predetermined rotational speed until a predetermined time has elapsed, after which the limiting of the torque of the motor/generator is started.

3. The vehicle control method as recited in claim 2, wherein
the target motor rotational speed when limiting the torque of the motor/generator is set to the predetermined rotational speed.

4. The vehicle control method as recited in claim 1, wherein
the target motor rotational speed when limiting the torque of the motor/generator is set to the predetermined rotational speed.

5. A vehicle control device comprising:
a friction clutch configured to switch between engagement and disengagement between a motor/generator and a drive wheel,
an oil pump configured to supply hydraulic oil pressure to the friction clutch,
an electric oil pump that is driven by an electric motor to supply hydraulic oil pressure to the friction clutch, and
a control unit that maintains the friction clutch disengaged with slack eliminated in a stroke while the vehicle is stopped, that reduces the motor rotational speed using a predetermined rotational speed as a target motor rotational speed in response to a request to stop the motor/generator, if the motor rotational speed of the motor/generator is greater than the predetermined rotational speed, and reduces the motor rotational speed toward zero that when the motor rotational speed has reached the predetermined rotational speed while limiting torque of the motor/generator.

* * * * *